United States Patent
Yu et al.

(10) Patent No.: US 7,307,456 B2
(45) Date of Patent: Dec. 11, 2007

(54) AUTOMATIC STATUS ASSIGNMENT LOGIC CIRCUIT APPARATUS FOR BAY DEVICES

(75) Inventors: Chen-Yo Yu, Taipei (TW); Chun-Hsien Wu, Kaohsiung (TW)

(73) Assignee: Quanta Computer Inc., Taoyuan Hsien (TW)

( * ) Notice: Subject to any disclaimer, the term of this patent is extended or adjusted under 35 U.S.C. 154(b) by 62 days.

(21) Appl. No.: 11/439,125

(22) Filed: May 24, 2006

(65) Prior Publication Data

US 2006/0212631 A1 Sep. 21, 2006

Related U.S. Application Data

(62) Division of application No. 10/225,161, filed on Aug. 22, 2002, now Pat. No. 7,069,364.

(51) Int. Cl.
*H03K 19/082* (2006.01)
(52) U.S. Cl. .......................................... 326/89; 326/75
(58) Field of Classification Search ................. 326/75, 326/82, 89, 90–91
See application file for complete search history.

(56) References Cited

U.S. PATENT DOCUMENTS

| | | | |
|---|---|---|---|
| 4,697,103 A * | 9/1987 | Ferris et al. | ................... 326/89 |
| 5,519,882 A | 5/1996 | Asano et al. | |
| 5,581,715 A | 12/1996 | Verinsky et al. | |
| 6,016,518 A | 1/2000 | Matsushima et al. | |
| 6,038,624 A | 3/2000 | Chan et al. | |
| 6,538,472 B1 * | 3/2003 | McGee | ........................ 326/82 |
| 6,553,432 B1 | 4/2003 | Critz et al. | |
| 6,647,436 B1 | 11/2003 | Jedrzejewski et al. | |
| 6,779,068 B2 | 8/2004 | Kim | |

OTHER PUBLICATIONS

"IDE/ATA Hard Drive Interface". ctips.com. Online Mar. 15, 1997. Retrieved from Internet Oct. 11, 2005. <http://www.ctips.com/hdide.html>.
"HITACHI ProprietaryInterface". ctips.com. Online Jul. 11, 1997. Retrieved from Internet Oct. 11, 2005. <http://www.ctips.com/prop_hitachi.html>.
"PANASONIC Proprietary Interface". ctips.com. Online Jul. 5, 1997. Retrieved from Internet Oct. 11, 2005.<http://www.ctips.com/prop_panasonic.html>.
"MITSUMI Proprietary Interface". ctips.com. Online Jul. 5, 1997. Retrieved from Internet Oct. 11, 2005.<http://www.ctips.com/prop_mitsumi.html>.
Device Bay Interface Specification. Revision 0.90. Compaq Corporation et al. Nov. 6, 1996.

* cited by examiner

*Primary Examiner*—James H. Cho

(57) ABSTRACT

In accordance with the present invention, the circuit apparatus has a first and a second connection point each for respectively connecting to the first bay and second bay for communicating with them to determine which device in the bays is the master device. The circuit apparatus also has a third and a fourth connection point both of them for connecting to the first bay or second bay for receiving the Boolean algebra to determine which device is the master device. The circuit apparatus further has a fifth connection point for determining whether the circuit apparatus works.

10 Claims, 4 Drawing Sheets

| Device | Boolean algebra value | |
|---|---|---|
| Non-IDE Device (Floppy Disc) | 0 | 0 |
| IDE Device (Hard Diss) | 0 | 1 |
| IDE Device (CD/DVD ROM) | 1 | 0 |

Fig. 4A

| Boolean algebra value | IDE status |
|---|---|
| 0 | Master |
| 1 | Slave |

Fig. 4B

AUTOMATIC STATUS ASSIGNMENT LOGIC CIRCUIT APPARATUS FOR BAY DEVICES

RELATED APPLICATION

This application is a Divisional of U.S. patent application Ser. No. 10/225,161, filed Aug. 22, 2002 now U.S. Pat. No. 7,069,364.

FIELD OF THE INVENTION

The present invention relates in general to a logical circuit apparatus for computer systems. In particular, the present invention provides a logical circuit apparatus that is capable of automatically assigning the master/slave status of the devices in the first device bay and the second device bay of a computer.

BACKGROUND OF THE INVENTION

Computer users are placing a growing demand on their computers' storage capabilities. As operating systems and programs increase in complexity, power and size, as users store greater amounts of information, and as that information becomes more complex, space on the computer's hard disk drive is quickly used up. In order to gain more storage capacity, many users desire to add a second storage apparatus, such as a hard disk drive, CD drives or DVD drives, to their system.

The present invention satisfies this above need by adding a selective circuit apparatus. FIG. 1 shows a block diagram of the device bay system according to the present invention. In FIG. 1, two bay devices 22 and 24 by connected by an IDE bus 20. The IDE bus 20 is thus a means of communication between the two bay devices 22 and 24. The two bay devices 22 and 24, first bay device and second bay device, are respectively connected with the first-bay connector 32 and the second-bay connector 30. The IDE bus 20 is comprised of a standard collection of signals for communicating data, commands and status. One of these signals includes the Pass Diagnostics signal (PDIAG*) transmitted by the interface line 26.

Device Bay, which is receiving broad industry acceptance, defines an industry specification for interchangeable peripheral devices, such as hard disk drives, modems, network adapters, CD drives, DVD drives and a variety of other electronics devices. Any peripheral can be plugged into the Device Bay without users having to open the PC box or switch it off. It will allow devices to be daisy-chained and software will take care of which interface is used by the device. With Device Bay, a user would be able to insert a peripheral like a DVD drive directly into a PC without opening, rebooting or turning off the PC.

One of the most popular ways to connect a second storage apparatus to a personal computer system is on the IDE bus. IDE (Integrated Drive Electronics) is a standard electronic interface used between a computer motherboard's data paths or bus and the computer's storage devices. The IDE interface is based on the IBM PC Industry Standard Architecture (ISA) 16-bit bus standard, but it is also used in computers that use other bus standards. The IDE interface was originally designed as a hard disk drive interface that could handle only two physical drives. One or two IDE drive units may be present on each IDE controller. When two drives are installed, they are cascaded on a common data/control cable, with one assigned as the master, and the other as the slave drive. Either of the two installed drives can be configured as the master or the slave drive via the setting of one or more switches, or more commonly Berg jumpers, on the electronic printed circuit board of the drives.

To use one drive as a master drive or a first drive and the other drive as a slave drive, or a second drive, control signals indicating a master and a slave must be supplied to IDE controllers for these drives. When a controller detects the control signal indicating a master, that drive operates as a master drive. On the other hand, when a controller detects the control signal indicating a slave, then that drive operates as a slave drive.

However, the configuration of the master and slave drives in the primary and secondary cascades of a conventional IDE interface can be adjusted only by physically changing a drive jumper setting and the cabling. In other words, if the first device bay is fixed for the master drive and the second device bay for the slave drive, such assignment requires that the floppy disk or other devices not supporting the IDE interface have to plug into the second device bay. Such requirement limits the hardware configuration being easily upgrade because the specific device needs to be plugged into the specific device bay. There is therefore a great need for a computer system that may automatically assign the master/slave status of devices in the first device bay and the second device bay of a computer. The user is then freed from worrying about where is the master device between the first and second bays and the computer system is consequently easier to upgrade and use.

SUMMARY OF THE INVENTION

It is therefore an object of the present invention to provide a selective circuit to automatically assign the master/slave status of devices in the first device bay and the second device bay. It is capable of ensuring normally performance of this computer system even when a floppy disk is inserted into the first device bay.

It is therefore an object of the present invention to provide a circuit apparatus for selecting the master and slave configuration of an IDE interface.

It is another object of the present invention to provide an automatically assigning circuit apparatus which is capable of facilitating the upgrade of computer system.

The present invention achieves the above-identified objects by providing a logical circuit apparatus for selecting the master and slave configuration of an IDE interface between the first and second bays. In accordance with the present invention, the logical circuit apparatus has a first and a second connection point each for respectively connecting to the first bay and second bay connector for assigning them which is the master device. The circuit apparatus also has a third and a fourth connection points both of them for connecting to the first bay or second bay connector for receiving the Boolean algebra to determine which device in these bays is the master device. The circuit apparatus further has a fifth connection point for determining whether the circuit apparatus works.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 4A shows the setting of the Boolean algebra value of the bay devices in the present invention; and FIG. 4B shows the setting of the Boolean algebra value of the IDE status in the present invention.

DETAILED DESCRIPTION OF THE PREFERRED EMBODIMENT

Without limiting the spirit and scope of the present invention, the circuit apparatus applied in computer system for automatically assigning the master/slave status of devices in the first device bay and the second device bay of a computer in the present invention is illustrated with preferred embodiments.

Figure 1:
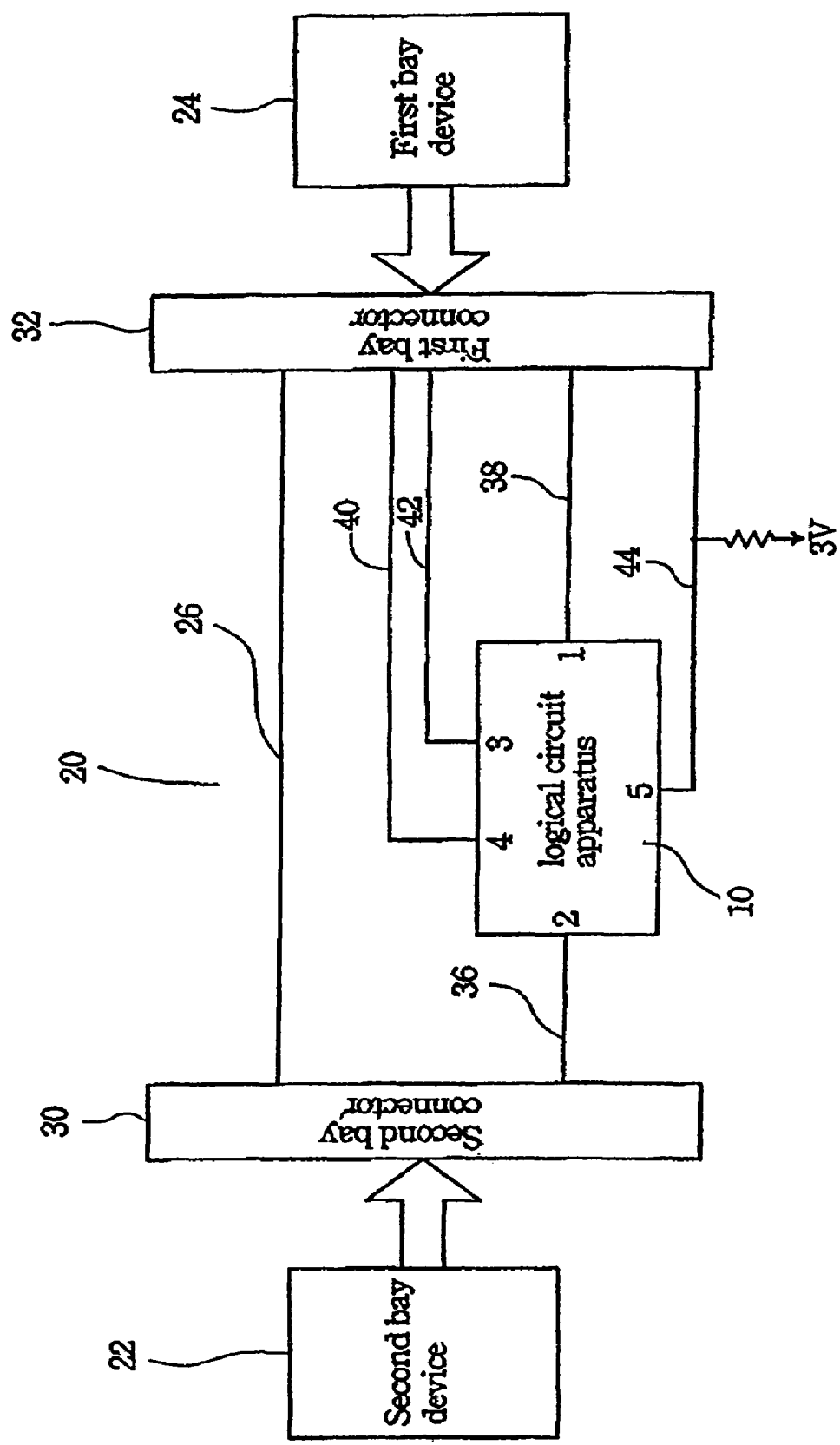
FIG. 1 shows a block diagram of the device bay system according to the first preferred embodiment the present invention.

The present invention satisfies this above need by adding a selective circuit apparatus. FIG. 1 shows a block diagram of the device bay system according to the present invention. In FIG. 1, two bay devices 22 and 24 by connected by an IDE bus 20. The IDE bus 20 is thus a means of communication between the two bay devices 22 and 24. The two bay devices 22 and 24, first bay device and second bay device, are respectively connected with the first-bay connector 32 and the second-bay connector 30. The IDE bus 20 is comprised of a standard collection of signals for communicating data, commands and status. One of these signals includes the Pass Diagnostics signal (PDIAG*) transmitted by the interface line 26.

In accordance with the hot plugging technology of the device bay, the first bay or the second bay could be plugged with an IDE device or a non-IDE device. Therefore, if this original set of this computer system is that the first bay device 24 is the master device and the second bay device 22 is the slave device, this computer system will be in an abnormal situation when the first bay connector 32 is plugged by a non-IDE device and the second bay connector 30 is plugged by a IDE device. This present invention provides a logic circuit apparatus to solve this above problem.

Please referring to FIG. 1 again, the apparatus for automatic assigning the master and the slave device of an IDE interface of a computer system, in accordance with a preferred embodiment of the present invention, comprises a logical circuit apparatus 10 that is inserted between the first bay connector 32 and the second bay connector 30. The logical circuit apparatus 10 comprising one function to automatic assign the master and slave configuration between the first bay device and the second bay device. The automatic assignment function is responsible for a non-IDE device plugged into the bay whose original set is for IDE device. Signal in relation to the swap of the master and slave device is handled.

As seen in FIG. 1, the number 1 to 5 represents the connection points. The logical circuit apparatus 10 has a first connection point 1 for connecting with the first bay connector 32 through the interface line 38 and a second connection point 2 for connecting with the second bay connector 30 by the interface lines 36. The main function of the two interface lines 36 and 38 is to assign the two bay devices which one is the master device. In accordance with the preferred embodiment of the present invention, if a Boolean algebra value "0" is assigned to the connection point 2 and a Boolean algebra value "1" is assigned to the connection point 1, the IDE status of the device inserted into the second bay connector 30 will be a master and the device inserted into the first bay connector 32 will be a slave. On the other hand, if a Boolean algebra value "1" is assigned to the connection point 2 and a Boolean algebra value "0" is assigned to the connection point 1, the IDE status of the device inserted into the second bay connector 30 will be a slave and the device inserted into the first bay connector 32 will be a master.

The logical circuit apparatus 10 also has a third and a fourth connection points 3 and 4 both of them through the interface lines 40 and 42 to connect to the first bay connector 32 for receiving the Boolean algebra to determine which device in these device bays is the master device. It is notice that the third and a fourth connection points also may be connected to the second bay connector 30 if the original setting of the computer system is that the second bay device is the master device. On the other hand, the Boolean algebra value is determined by the device plugged into the first bay connector 32, which is received by the logical circuit apparatus 10 via interface lines 40 and 42. In accordance with the preferred embodiment, the Boolean algebra value of the IDE bay device is set to (1,0) or (0,1) and the non-IDE bay device is set to (0,0).

The logical circuit apparatus 10 further has a fifth connection point for connecting with the first bay connector 32 through an interface line 44 for determining whether the circuit apparatus works. In accordance with the present invention, a 3V voltage is applied to the interface line 44 as shown in FIG. 1 to shut down the logical circuit apparatus 10. On the other hand, when a device, no matter an IDE or a non-IDE device, is inserted into the first bay connector 32, the applied 3V voltage will be pulled down to zero to start up the logical circuit apparatus 10.

Figure 2:
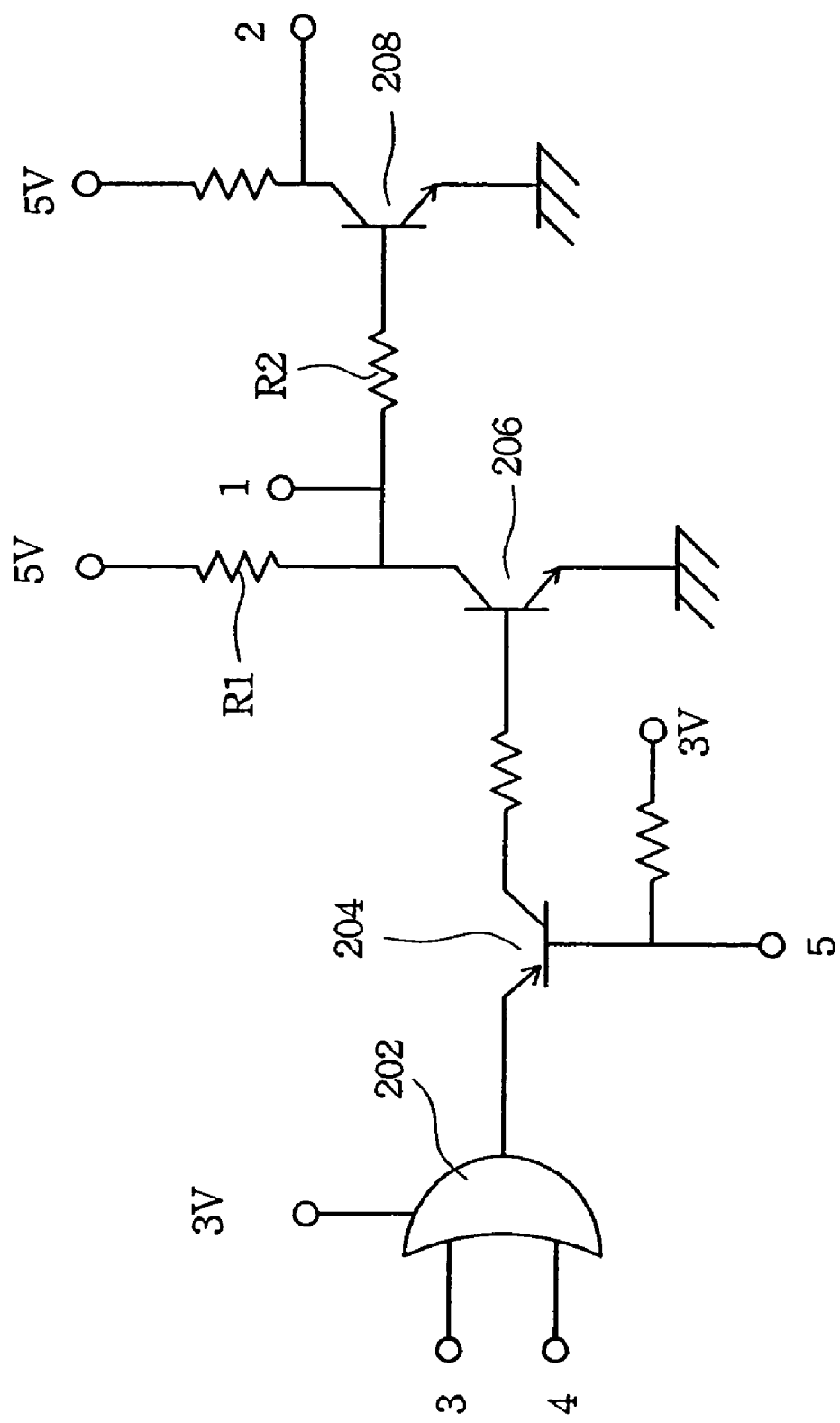
FIG. 2 shows a detail drawing of the logical circuit apparatus of the present invention.

Please referring to FIG. 2, it shows a detail drawing of the logical circuit apparatus 10 and the number 1 to 5 represents the connection points. When a device is plugged into the first bay connector, the set Boolean algebra value of the device will be sent to the connection points 3 and 4 of the OR gate 202. In accordance with the preferred embodiment of the present invention, the Boolean algebra value is (0,0) if the inserted device is a non-IDE device. On the other hand, the Boolean algebra value is (0,1) or (1,0) if the inserted device is an IDE device.

If a non-IDE device, a floppy drive, is inserted into the first bay connector, the Boolean algebra value (0,0) will be respectively sent to the connection points 3 and 4, and the OR gate 202 will output a low voltage to the emitter electrode of the bipolar junction transistor 204 (BJT). On the other hand, the connection point 5 will be pull down because a device is inserted into the first bay connector. At the same time, the pull down voltage will conduct the transistor 204. The outputted low voltage of the OR gate 202 will pass through the transistor 204 to apply to the base electrode of the transistor 206. The low voltage will not conduct the transistor 206. Therefore, the high voltage 5V will be direct applied to the base electrode of the transistor 208 to conduct the transistor 208. Because the transistor 208 is conducted, the voltage value of the connection point 2 will be pull down to zero. On the other hand, the voltage value of the connection point 1 depends on the resistance value of the resistance $R_1$ and $R_2$. However, the connection point 1 may be designed to represent a high voltage. Therefore, the connection point 1 will represent a corresponding "high" voltage, the Boolean algebra value "1", and the connection point 2 will represent a corresponding "low" voltage, the Boolean algebra value "0". In accordance with the configuration design of the present invention, the connection point 1 and the connection point 2 will always represent the different Boolean algebra value. For example, if the connection point 1 represents the Boolean algebra value "1", the connection point 2 will represent the Boolean algebra value "0", in vice versa. Therefore, the IDE status of the device inserted into the second bay connector 30 will be a master and the device inserted into the first bay connector 32 will be a slave.

Although this original set of this computer system is that the first bay device 24, please referring to FIG. 1, is the master device, the logical circuit apparatus 10 of the present invention will switch the second bay device as the master device if the device plugged into the first bay connector 32 is a non-IDE device.

On the other hand, please still referring to FIG. 2, if an IDE device, an IDE hard disc or an IDE CD ROM, is inserted into the first bay connector, the Boolean algebra value (1,0) or (0,1) will be respectively sent to the connection points 3 and 4. Then, the OR gate 202 will output a high voltage to the emitter electrode of the bipolar junction transistor 204 (BJT). On the other hand, the connection point 5 will be pull down and conduct the transistor 204. The high voltage outputted from the OR gate 202 will pass through the transistor 204 to conduct the transistor 206. Then, the connection point 1 will be pull down to zero, the Boolean algebra value "0". The zero voltage will not conduct the transistor 208, therefore, the connection point 2 will represent high voltage, the Boolean algebra value "1". In other words, the IDE status of the device inserted into the second bay connector 30 will be a slave and the device inserted into the first bay connector 32 will be a master which is same as the original set of this computer system.

Figure 3:
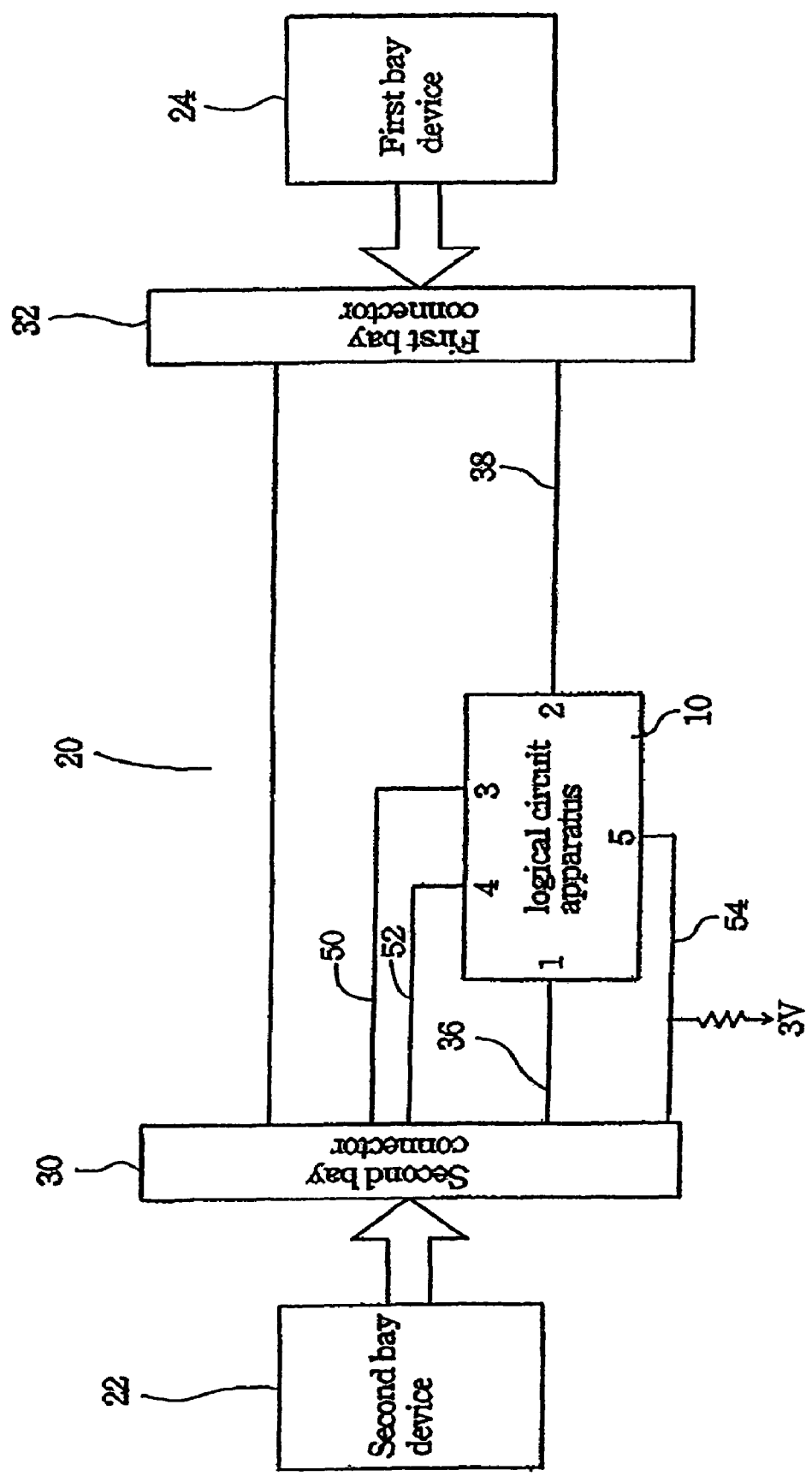
FIG. 3 shows a block diagram of the device bay system according to the second preferred embodiment the present invention.

Please refer to FIG. 3, it shows another preferred embodiment of the present invention. The number 1 to 5 represents the connection points. The first connection point 1 is connected with the second bay connector 30 through the interface line 36 and the second connection point 2 is connected with the first bay connector 32 by the interface lines 38. In accordance with the another preferred embodiment of the present invention, if a Boolean algebra value "1" is assigned to the connection point 2 and a Boolean algebra value "0" is assigned to the connection point 1, the IDE status of the device inserted into the second bay connector 30 will be a master and the device inserted into the first bay connector 32 will be a slave. On the other hand, if a Boolean algebra value "0", is assigned to the connection point 2 and a Boolean algebra value "1" is assigned to the connection point 1, the IDE status of the device inserted into the second bay connector 30 will be a slave and the device inserted into the first bay connector 32 will be a master.

Please refer to FIG. 3 again, the third and a fourth connection points 3 and 4 both of them through the interface lines 50 and 52 to connect to the second bay connector 30 for receiving the Boolean algebra to determine which device in these device bays is the master device. The received Boolean algebra value is received via interface lines (50 and 52) and determined by the device plugged into the second bay connector 30. In accordance with the another preferred embodiment, the Boolean algebra value of the IDE bay device is set to (1,0) or (0,1) and the non-IDE bay device is set to (0,0).

In accordance with the preferred embodiment of the present invention, this original set of this computer system is that the second bay device 22 is the master device and the first bay device 24 is the slave device. Therefore, the logical circuit apparatus 10 of the present invention will switch the first bay device 24 as the master device if the device plugged into the second bay connector 30 is a non-IDE device.

For example, please referring to FIG. 2 again, if a non-IDE device, such as a floppy drive, is inserted into the second bay connector 30, the Boolean algebra value (0,0) will be respectively sent to the connection points 3 and 4. Then, the OR gate 202 will output a low voltage to the emitter electrode of the bipolar junction transistor 204 (BJT). The connection point 5 will be pull down and conduct the transistor 204. The low voltage outputted from the OR gate 202 will pass through the transistor 204 to apply to the transistor 206. This voltage will not conduct the transistor 206. Therefore, the connection point 1 will be pull up to high, the Boolean algebra value "1". The high voltage will conduct the transistor 208, therefore, the connection point 2 will be pull down to zero, the Boolean algebra value "0". In other words, the IDE status of the device inserted into the second bay connector 30 will be a slave and the device inserted into the first bay connector 32 will be a master. The logic circuit apparatus of the present invention may automatic assign the master and slave status of the bay device. Therefore, the configuration selection signals in the connection points 1 and 2 may be generated by the logical circuit apparatus 10.

In accordance with the circuit design as shown in the FIG. 2 of the present invention, the connection point 1 and the connection point 2 will always represent the different Boolean algebra value. For example, if the connection point 1 represents the Boolean algebra value "1", the connection point 2 will represent the Boolean algebra value "0", in vice versa.

In accordance with the two embodiments of the present invention, please referring to FIG. 4A, it shows the setting of the Boolean algebra value in the present invention. In accordance with the present invention, the Boolean algebra value of the non-IDE device, floppy drive, is (0,0). The Boolean algebra value of the IDE device, hard disc, is (0,1) and the Boolean algebra value of the IDE device, CD or DVD ROM, is (1,0). On the other hand, the FIG. 4B shows the setting of the IDE status. In accordance with the two embodiments, the Boolean algebra value "0" represents the IDE status is master. The Boolean algebra value "1" represents the IDE status is slave.

As is understood by a person skilled in the art, the foregoing two preferred embodiments of the present invention are illustrative of the present invention rather than limiting of the present invention. They are intended to cover various modifications and similar arrangements included within the spirit and scope of the appended claims, for example, the logic circuit apparatus is not just only this kind of design as described in the above, the other circuit design having the same function also may be used in this present invention. The scope of which should be accorded the broadest interpretation so as to encompass all such modifications and similar structure.

What is claimed is:

1. An automatic assignment logical circuit apparatus for selecting a master device and a slave device from among a first bay device and a second bay device, wherein said first bay device being connected to the first bay connector and said second bay device being connected to the second bay connector, and said first bay connector and said second bay connector are in cascaded, said automatic assignment logical circuit apparatus comprising:

an OR gate having first and second connection points for electrically connecting to said first bay connector, wherein said first and second connection points for receiving a pair of Boolean algebra value from said first bay connector and output a first Boolean algebra value;

a first transistor having a emitter electrode for receiving said first Boolean algebra value and having base electrode for electrically connecting to said first bay connector and a reference voltage also applied to said base electrode, wherein said first transistor will be conducted when a device is plugged into said first bay connector to trigger said base electrode and said base electrode will not be triggered when a device is pulled out said first bay connector;

a second transistor having a base electrode for receiving said first Boolean algebra value passed through said first transistor and a collector electrode for electrically connecting to said first bay connector, wherein said second transistor will be conducted when said first Boolean algebra value having high level and generates a second Boolean algebra value at said collector electrode for sending to said first bay connector and a high voltage also applied to said collector electrode; and a third transistor having a base electrode for receiving said second Boolean algebra value passing through said second transistor and generating a third Boolean algebra value at said third transistor's collector electrode which is electrically connected to said second bay connector, wherein said third transistor will be conducted when said second Boolean algebra value having high level and said generated third Boolean algebra value for sending to said second bay connector and a high voltage also applied to said collector electrode.

2. The automatic assignment logical circuit apparatus according to claim 1, wherein said pair of Boolean algebra value is related to the device plugged into said first bay connector.

3. The automatic assignment logical circuit apparatus according to claim 1, wherein said pair of Boolean algebra value is (0,0) when the device plugged into said first bay connector is a non-IDE device.

4. The automatic assignment logical circuit apparatus according to claim 1, wherein said pair of Boolean algebra value is (1,0) or (0,1) when the device plugged into said first bay connector is an IDE device.

5. The automatic assignment logical circuit apparatus according to claim 1, wherein said first bay connector is the master device connector when said second Boolean algebra value is "0".

6. The automatic assignment logical circuit apparatus according to claim 1, wherein said first bay connector is the slave device connector when said second Boolean algebra value is "1".

7. The automatic assignment logical circuit apparatus according to claim 1, wherein said second bay connector is the master device connector when said third Boolean algebra value is "0".

8. The automatic assignment logical circuit apparatus according to claim 1, wherein said second bay connector is the slave device connector when said third Boolean algebra value is "1".

9. The automatic assignment logical circuit apparatus according to claim 1, wherein said second and third Boolean algebra value is different.

10. The automatic assignment logical circuit apparatus according to claim 1, wherein said first and second Boolean algebra value is different.

* * * * *